(12) United States Patent
Bennett et al.

(10) Patent No.: US 9,376,002 B2
(45) Date of Patent: Jun. 28, 2016

(54) COMBINATION ROOF RACK AND REMOVABLE SOFT TOP

(71) Applicant: Omix-Ada, Inc., Suwanee, GA (US)

(72) Inventors: Patrick W. Bennett, Gainesville, GA (US); Christopher Douglas Van Buren, Snellville, GA (US)

(73) Assignee: Omix-Ada, Inc., Suwanee, GA (US)

( * ) Notice: Subject to any disclaimer, the term of this patent is extended or adjusted under 35 U.S.C. 154(b) by 29 days.

(21) Appl. No.: 14/531,742

(22) Filed: Nov. 3, 2014

(65) Prior Publication Data
US 2015/0123422 A1    May 7, 2015

Related U.S. Application Data

(60) Provisional application No. 61/899,439, filed on Nov. 4, 2013.

(51) Int. Cl.
  *B60J 7/10* (2006.01)
  *B60R 9/04* (2006.01)
  *B60J 7/06* (2006.01)

(52) U.S. Cl.
  CPC ........ *B60J 7/102* (2013.01); *B60J 7/061* (2013.01); *B60R 9/04* (2013.01); *Y10T 29/49622* (2015.01)

(58) Field of Classification Search
  CPC ........ B60J 7/0053; B60J 7/0061; B60J 7/061; B60J 7/062; B60J 7/064; B60J 7/065; B60J 7/10; B60J 7/102; B60J 7/104; B60R 9/04; B60R 9/052; B60R 2021/137
  See application file for complete search history.

(56) References Cited

U.S. PATENT DOCUMENTS

| | | | | |
|---|---|---|---|---|
| 1,070,347 | A * | 8/1913 | Lumplugh | B60J 7/064 296/109 |
| 3,524,674 | A * | 8/1970 | Medeiros | B60J 7/104 296/102 |
| 3,874,721 | A * | 4/1975 | Tuggle | B60J 7/062 296/105 |
| 4,179,152 | A * | 12/1979 | Kent, Jr. | B60J 7/104 296/102 |

(Continued)

FOREIGN PATENT DOCUMENTS

| | | | | |
|---|---|---|---|---|
| CH | 187943 A | * 11/1936 | | B60J 7/064 |
| DE | 3340063 A1 | * 5/1985 | | B60J 7/065 |

(Continued)

OTHER PUBLICATIONS

Attached Images. Captured from Google search on Jan. 17, 2013.

*Primary Examiner* — Glenn Dayoan
*Assistant Examiner* — Paul Chenevert
(74) *Attorney, Agent, or Firm* — Womble Carlyle Sandridge & Rice LLP

(57) ABSTRACT

A roof rack and soft top assembly for a vehicle having an exposed passenger compartment protected by a windshield and a roll cage. The assembly includes an outer frame mounted to the vehicle exterior to the roll cage and surrounding a rear passenger compartment, and a plurality of slide rails mounted to the top of the roll cage above a front passenger compartment. The assembly further includes a soft top suspended from the outer frame with fasteners and a header assembly attached to a forward portion of the soft top that slides along the slide rails to engage with the top edge of the windshield, thereby covering the front passenger compartment. When open air driving is desired, the soft top can be withdrawn or removed from the slide rails and the outer frame and stored in the vehicle.

20 Claims, 14 Drawing Sheets

(56) References Cited

U.S. PATENT DOCUMENTS

| | | | | |
|---|---|---|---|---|
| 4,215,894 A | * | 8/1980 | Sidlinger | B60P 3/423 135/88.09 |
| 4,733,902 A | * | 3/1988 | Rabb | B60J 7/104 296/214 |
| 4,773,694 A | * | 9/1988 | Gerber | B60J 7/104 296/77.1 |
| 4,789,196 A | * | 12/1988 | Fields | B60J 7/062 296/100.04 |
| 5,381,939 A | | 1/1995 | Tippets | |
| 5,492,259 A | | 2/1996 | Tippets | |
| 5,531,497 A | * | 7/1996 | Cheng | B60J 7/061 296/100.01 |
| 5,803,529 A | * | 9/1998 | Perry-Bores | B60J 7/10 296/107.09 |
| 5,992,917 A | * | 11/1999 | Hilliard | B60J 1/1815 296/103 |
| 6,068,168 A | | 5/2000 | Kreisler | |
| D434,718 S | | 12/2000 | Kreisler | |
| 6,241,305 B1 | * | 6/2001 | Troeger | B60J 7/104 160/327 |
| 6,505,879 B1 | * | 1/2003 | Arviso | B60J 7/102 296/100.18 |
| 7,025,404 B1 | * | 4/2006 | Gilbert | B60J 7/10 135/913 |
| 7,240,960 B2 | * | 7/2007 | Fallis, III | B60J 7/0053 296/107.19 |
| 7,828,364 B2 | | 11/2010 | Causey | |
| 8,944,486 B2 | * | 2/2015 | Donohoe | B62D 33/04 296/102 |
| 9,114,690 B1 | * | 8/2015 | Bowles | B60R 21/13 |
| 9,238,400 B2 | * | 1/2016 | Hanson | B60J 7/10 |
| 2005/0280293 A1 | * | 12/2005 | MacNee, III | B60J 1/14 296/219 |
| 2006/0017303 A1 | * | 1/2006 | Weege | B60J 7/062 296/105 |
| 2007/0018485 A1 | * | 1/2007 | Jacobson | B60J 1/2013 296/210 |
| 2011/0101056 A1 | * | 5/2011 | Barkey | B60R 9/052 224/321 |
| 2011/0233959 A1 | * | 9/2011 | Cover | B60J 7/10 296/107.09 |
| 2012/0193380 A1 | | 8/2012 | McMurtrie | |
| 2012/0235439 A1 | * | 9/2012 | Mazur | B60J 7/062 296/100.03 |
| 2013/0015218 A1 | * | 1/2013 | Surkin | B60R 9/048 224/309 |
| 2015/0352937 A1 | * | 12/2015 | Haberkamp | B60J 7/1291 296/219 |

FOREIGN PATENT DOCUMENTS

| | | | | |
|---|---|---|---|---|
| DE | 4039583 A1 | * | 6/1991 | B60J 7/061 |
| DE | EP 1400411 A2 | * | 3/2004 | B60R 9/04 |
| DE | 102004055404 A1 | * | 1/2006 | B60J 7/061 |
| DE | 102004032627 A1 | * | 2/2006 | B60J 7/047 |
| FR | 440477 A | * | 7/1912 | B60J 7/061 |
| FR | 929434 A | * | 12/1947 | B60J 7/104 |
| FR | 2937591 A1 | * | 4/2010 | B60J 7/061 |
| GB | 501078 A | * | 2/1939 | B60J 7/0061 |
| WO | WO 9819877 A1 | * | 5/1998 | B60J 7/10 |
| WO | WO 2011025874 A1 | * | 3/2011 | B60R 21/13 |

* cited by examiner

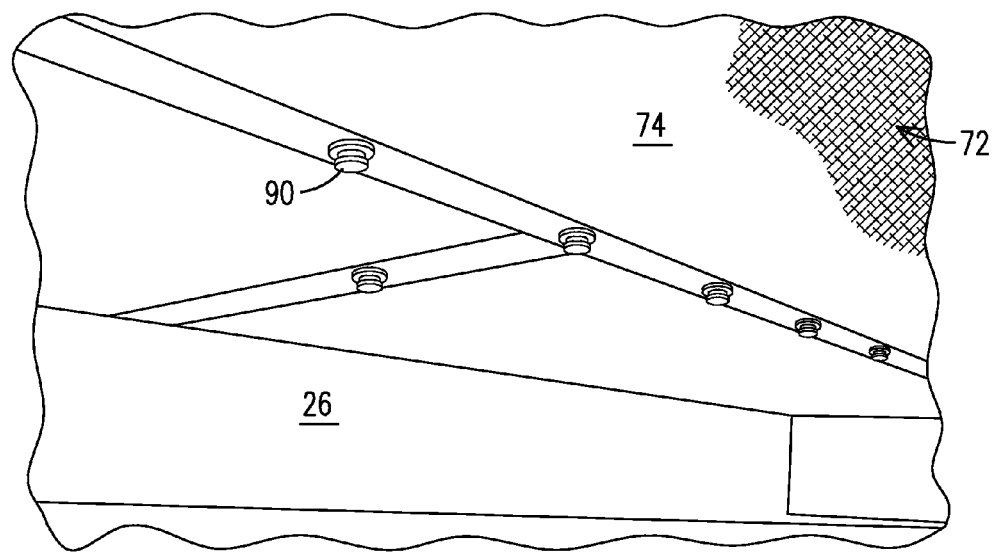
FIG. 12
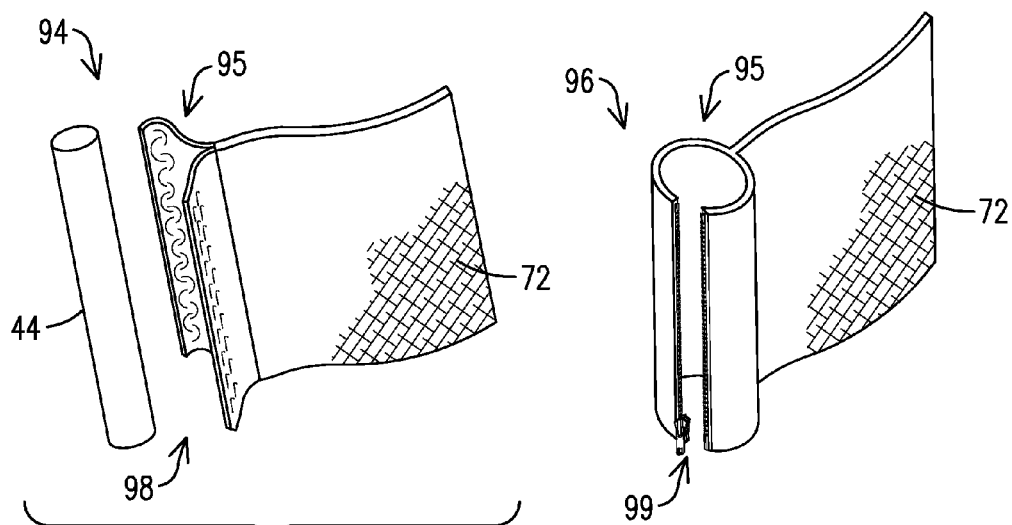
FIG. 13A
FIG. 13B

COMBINATION ROOF RACK AND REMOVABLE SOFT TOP

RELATED APPLICATIONS

This application claims the benefit of U.S. Provisional Patent Application No. 61/899,439, filed Nov. 4, 2013.

TECHNICAL FIELD

This application relates generally to vehicles and more specifically to roof or luggage racks and soft tops for open off-road vehicles, such as Jeep® Wrangler® and CJ® brand vehicles.

BACKGROUND

Off-road vehicles such as the Jeep® Wrangler® and CJ® are popular among outdoor enthusiasts because of their rugged build and appearance and their consequent ability to move over terrain where other vehicles cannot tread. In addition, the Wrangler® and CJ® models have open or exposed passenger compartments and an open rear compartment that are typically protected by a roll cage and a windshield. Factory soft tops are available for these vehicles that can be manually attached to the vehicle with snaps or a belt rail system, locking tabs, and the like, to enclose the front and rear passenger compartments. Factory tops, however, are cumbersome to install and can require several minutes for complete deployment.

Often when off-roading, owners of off-road vehicles such as those models mentioned above need to carry provisions, supplies, cloths, and other items for comfort and survival in the wild. While these vehicles have a rear cargo compartment behind the rear passenger seats, this compartment is relatively small and can be inadequate for storage of all the needed gear. The rear passenger seating area, where present, is thus sometimes taken up with provisions and gear, which reduces passenger seating. Further, provisions or gear that are used only at destinations or while camping are often mixed in with items that may need to be accessed while driving, such as water, food, clothing for inclement weather, and the like. This can make the immediately-needed items difficult to access absent advanced planning when packing of the vehicle.

Aftermarket roof or luggage racks are available for off-road vehicles such as the aforementioned Jeep® brand vehicles. Most of these racks comprise metal frames that mount to the vehicle in various ways and that extend upwardly on the outside of the soft or hard top of the vehicle, if installed, to a top platform configured to support luggage, provisions, camping gear, recreational equipment, and the like. Users can strap a large quantity of provisions or gear to the top platform. This preserves the passenger space in the vehicle itself for passengers and for the items that may need to be accessed while driving, and which can be conveniently stored in the vehicle where they are easily accessible. However, one problem with these prior art roof racks is that they are separate from and reside on the outside of a soft or hard top when such a top is mounted to the vehicle. This can make it even more difficult to remove the top when desired and requires that both a top and a separate roof rack be purchased and maintained.

A need therefore exists for a roof rack for off-road vehicles, and especially Jeep® brand off-road vehicles, that provides ample exterior space for strapping provisions when needed and that incorporates its own attachable and detachable soft top so that a separate soft top need not be carried along. The soft top should be easily removed when open-air motoring is desired and storable in a small area when not in use. It is to the provision of a such roof rack with a removable soft top that addresses these and other needs that the disclosure is primarily directed.

SUMMARY

Briefly described, a roof rack and soft top assembly for a vehicle body having an exposed passenger compartment protected by a windshield and a roll cage. The assembly generally includes an outer frame mounted to the vehicle body exterior to the roll cage and surrounding a rear portion of the passenger compartment. The assembly also includes a soft top between the outer frame and the roll cage, with the soft top comprising a fabric body having a plurality of fasteners spaced across a back portion of the fabric body and that are operable to removably attach the back portion to the outer frame to cover the rear portion of the passenger compartment. The assembly further includes a header assembly attached to a forward portion of the fabric body with a front edge that is operable to removably engage with the top edge of the windshield while drawing the forward portion of the fabric body over a front portion of the passenger compartment.

In one aspect the roof rack and soft top assembly also includes a plurality of rails mounted to the top of the roll cage above the front passenger compartment, and a plurality of movable blocks that form a portion of the header assembly and that are translatably engageable with the rails. In this embodiment the header assembly is operable to translate along the rails while drawing the forward portion of the fabric body over the front portion of the passenger compartment.

In another embodiment, the roof rack and soft top assembly generally includes an outer frame mounted to the vehicle body, exterior to the roll cage, and surrounding the rear passenger compartment, and a pair of slide rails mounted to the top of the roll cage above the front passenger compartment. The roof rack and soft top assembly further includes a soft top between the outer frame and the roll cage. The soft top includes a fabric body having a plurality of fasteners or attachment features spaced across a back portion thereof, and that are operable to removably suspend the back portion of the fabric body from the outer frame to cover the rear passenger compartment. The soft top also includes a header assembly that is attached to a forward portion of the fabric body. The header assembly has a pair of slide blocks that are slidably engageable with the slide rails and a front edge that is engageable with a top edge of the windshield, and is operable to slide along the slide rails to removably engage with the top edge of the windshield while drawing the forward portion of the fabric body over the front passenger compartment.

Another embodiment of the roof rack and soft top assembly includes a roof rack that is fabricated of a metal frame having vertical bars that support an upper platform. The frame is sized and configured so that it can be mounted to an off-road vehicle supporting the upper platform above the rear passenger compartments of the vehicle. In use, ample provisions can be strapped to the upper platform for transport to a destination such as an off-roading or camping location. The roof rack can be used as is for open air traveling when conditions are suitable. The roof rack and soft top assembly also includes a soft top made of interconnected fabric panels that are shaped to fit between or within the various bars of the frame to form an enclosure that encloses and protects passengers and gear within the vehicle. The soft top further includes a plurality of fasteners or attachment features spaced across a back portion, and that are operable to removably suspend the back portion of the fabric body from the metal frame and cover the rear passenger compartment. In addition, the front portion of the soft top includes a header assembly having slide blocks that are slidably engageable with two or more slide rails mounted to the top of a roll cage. The header assembly is operable to slide along the slide rails to removably engage with the top edge of the windshield while drawing the forward portion of the fabric body over the front passenger compartment.

When the soft top is attached to the frame, it forms a reliable enclosure without detracting from the utility of the roof rack for carrying provisions. In addition, the roof rack and soft top combination is considered by many to present a rugged and pleasing appearance. When detached, the fabric panels fold neatly and can be stored in the vehicle in a much smaller area than conventional soft tops. These and other aspects, features, and advantages of the roof rack with detachable soft top of this disclosure will become apparent to the skilled artisan upon review of the detailed description set forth below taken in conjunction with the accompanying drawing figures, which are briefly described as follows.

BRIEF DESCRIPTION OF THE DRAWINGS

FIG. 12 shows the plurality of fasteners used to attached the fabric body to the outer frame.

FIGS. 13A-13B illustrate alternative embodiments of fasteners used to attach the fabric body to the outer frame.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Figure 1:
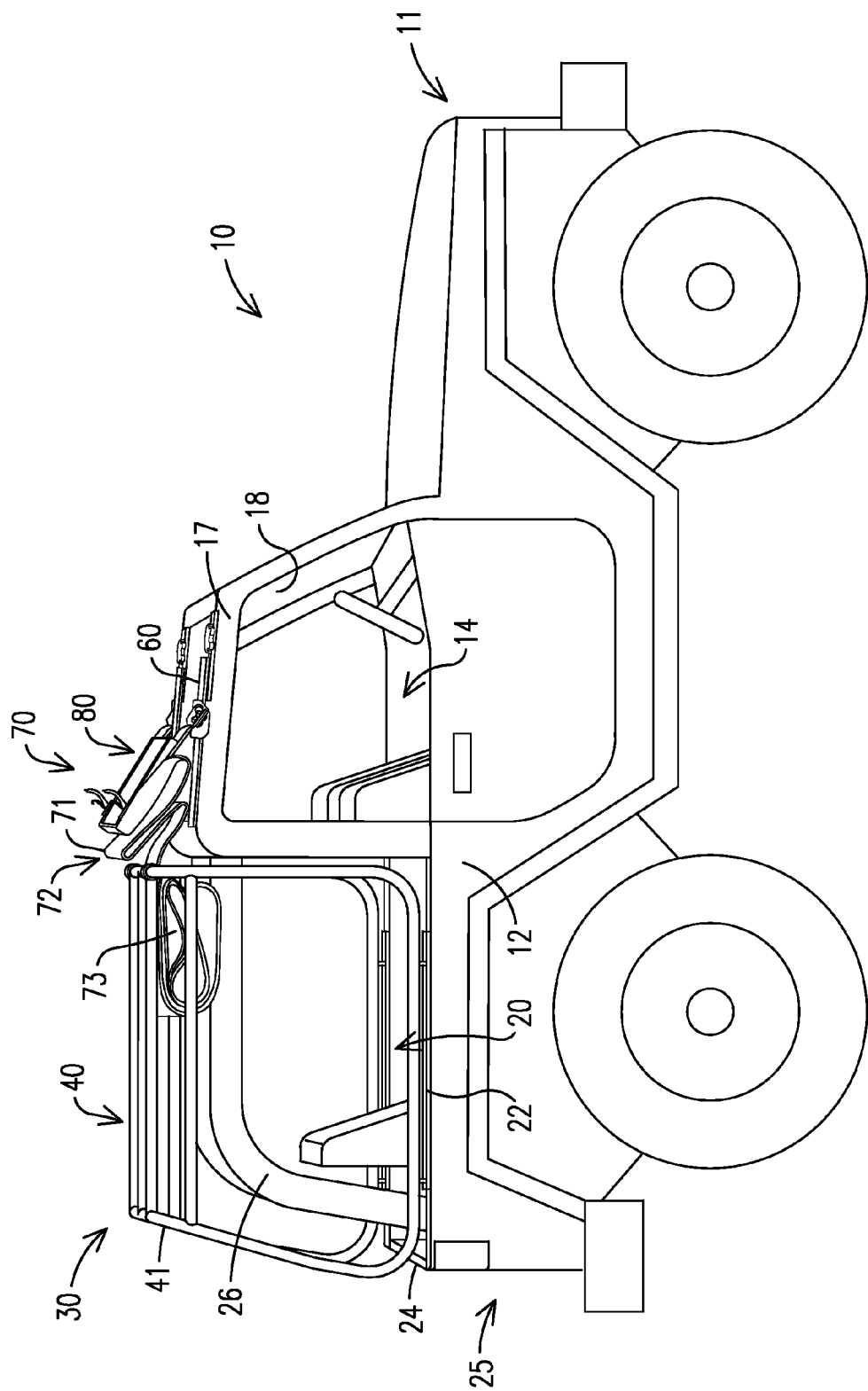
FIG. 1 is a side view of an off-road vehicle, a 2-door Jeep® in this case, with a combination roof rack and soft top assembly having the soft top in a retracted or withdrawn configuration, in accordance with one representative embodiment of the present disclosure.
Figure 21:
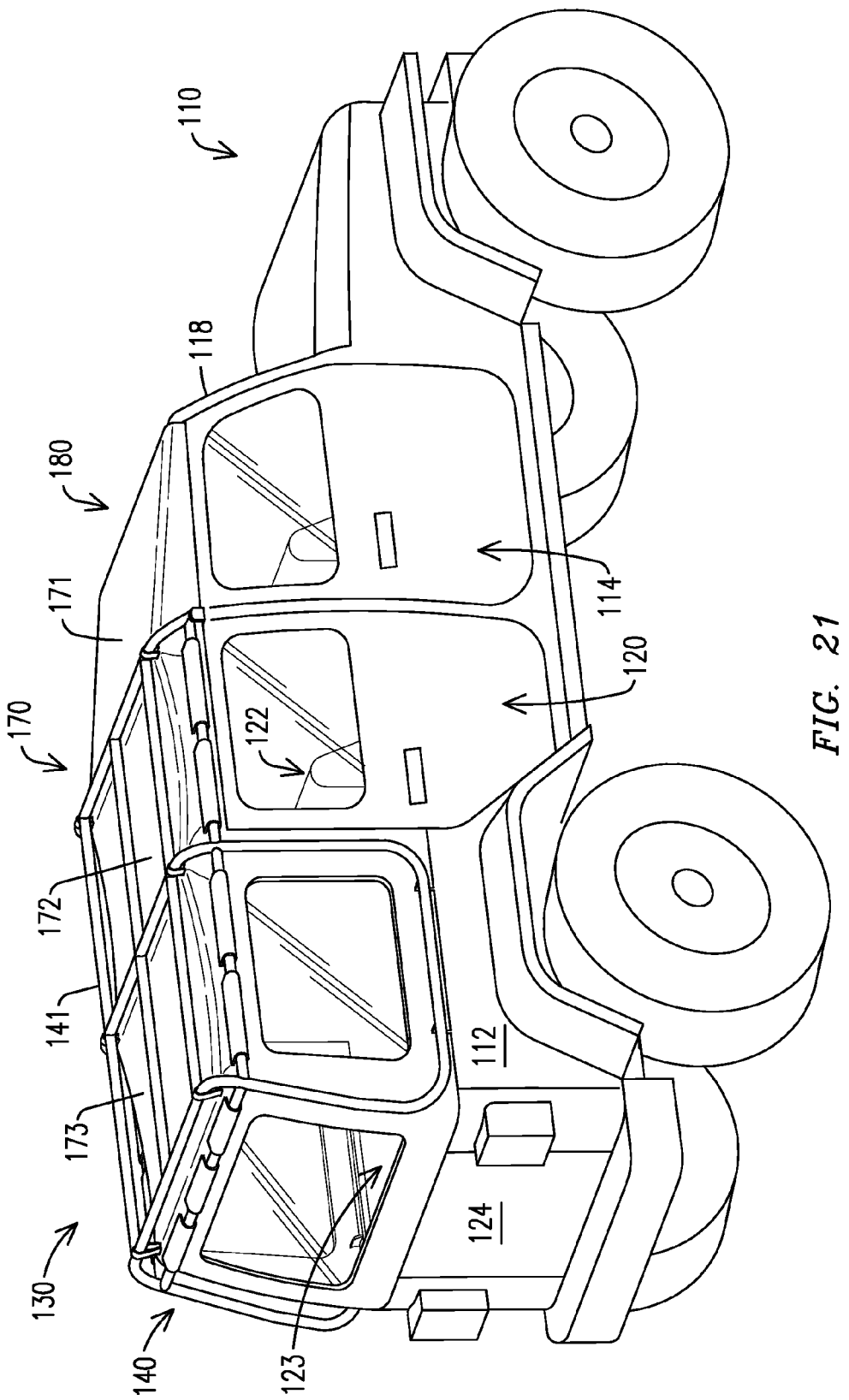
FIG. 21 a perspective view of a combination roof rack and soft top assembly deployed over a 4-door off-road vehicle, in accordance with another representative embodiment of the present disclosure.

Reference will now be made in more detail to the drawing figures, wherein like reference numbers, where appropriate, refer to like parts throughout the several views. FIG. 1 illustrates an off-road vehicle 10, which in this case is a 2-door Jeep® Wrangler® brand vehicle. For convenience, the invention will be described and shown herein within the context of a Jeep® Wrangler® brand off-road vehicle such as the one shown in FIG. 1. It will be understood by the skilled artisan, however, that the invention is not limited to any particular make or model of vehicle. Indeed, the combination roof rack and removable soft top of the present disclosure may also have particular application with trucks and ATVs and similar vehicles, both civilian and military, that have been adapted for off-road use. For example, as shown in FIG. 21, the roof rack and soft top assembly could also be adapted for use with a 4-door off-road vehicle.

Figure 2:
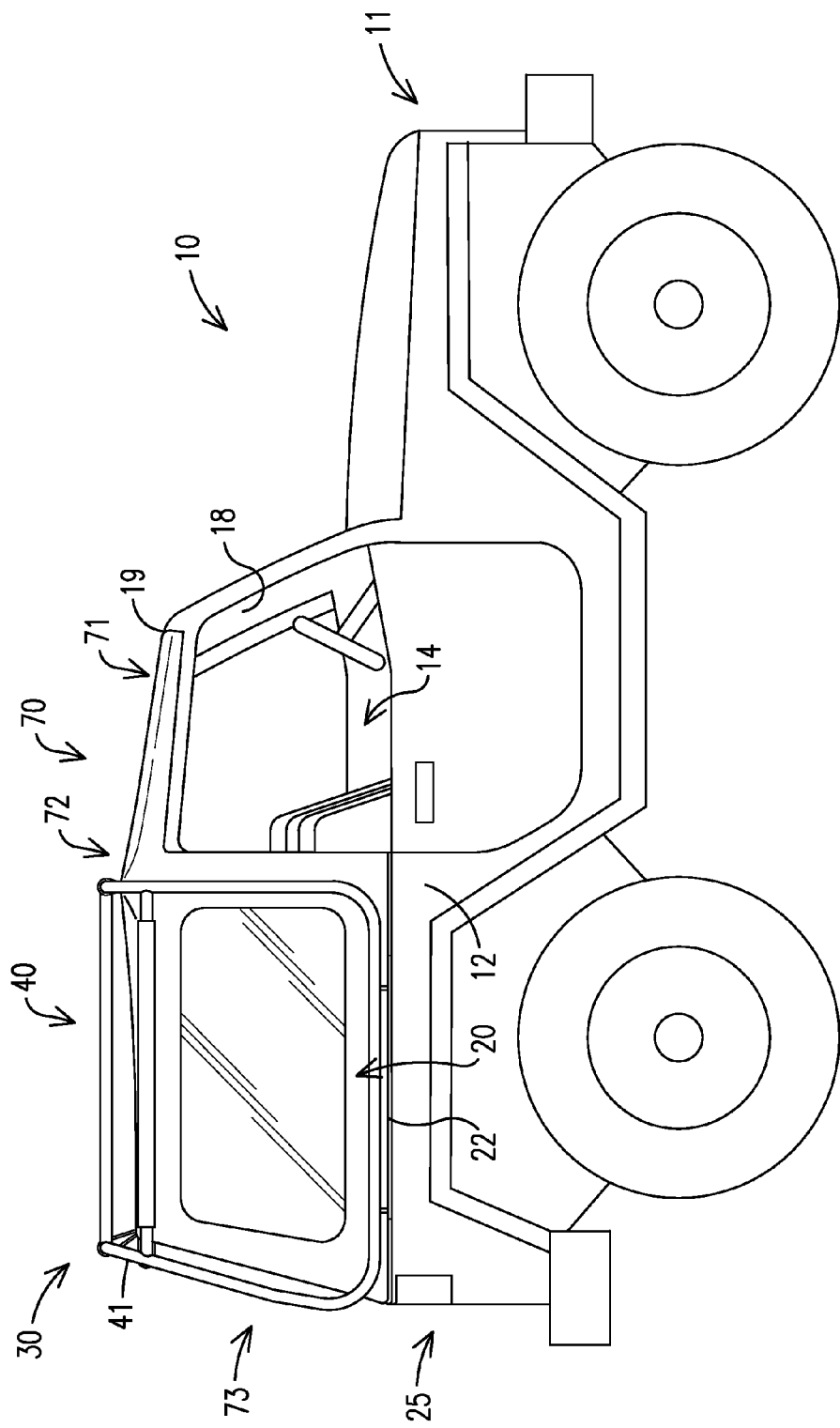
FIG. 2 is another side view of the roof rack and soft top assembly of FIG. 1, with the soft top in a deployed configuration.

With continued reference to FIGS. 1 and 2, the vehicle 10 has a vehicle body 12 having a front end portion 11 and a rear end portion 25. A pair of forward doors flanks a front or driver's portion 14 of the passenger compartment of the vehicle. Behind the front passenger compartment 14 is a rear passenger compartment 20 that is surrounded by a tub rail 22 and a tail gate 24. The rear passenger compartment 20 may also contain rear seats for additional passengers and a cargo compartment, as shown, or may be completely dedicated to cargo. In any event, the top of the vehicle is normally open to ambience absent a factory hard or soft top. A roll cage 26 is also provided to protect the occupants of the vehicle in the event of a crash or accident, while the front windshield 18 protects the occupants from oncoming wind while driving.

As shown in the figures, a combination roof rack and removable soft top 30, also known as a roof rack and soft top assembly, is mounted above the exposed passenger compartment of the vehicle 10 that is protected by the windshield 18 and the roll cage 26. The roof rack and soft top assembly 30 generally includes a roof rack 40 comprising an outer frame 41 that is mounted to the vehicle body 12 and surrounds the rear passenger compartment 20. In one aspect, the outer frame 41 can comprises a cage of interconnected bars. The base of the outer frame 41 is generally secured to the tub rails 22 on either side of the vehicle body 12, with the rest of the outer frame extending up and over the top of the vehicle 10, and exterior to the roll cage 26, to surround the portion of the roll cage 26 that protects the rear passenger compartment 20.

The roof rack and soft top assembly 30 also includes a soft top 70 comprising a fabric body 72 having a forward portion 71 and a back portion 73. The back portion 73 of the fabric body 72 may be removably coupled to the outer frame 41 with clips or similar fastening devices, so that the soft top 70 is suspended from the roof rack 40 between the outer frame 41 and the roll cage and covering the rear passenger compartment 20 (FIG. 2). When it is desirable to expose the rear passenger compartment 20 to ambience, in one aspect the back portion 73 of the fabric body 72 may be detached from outer frame 41 and folded forward so that it rests above a center portion of the roll cage 26 (FIG. 1).

The roof rack and soft top assembly 30 further includes a plurality of slide rails 60 mounted to the top of the roll cage 26 above the front portion 14 of the passenger compartment. The slide rails 60 are configured to support and guide a header assembly that is attached to the forward portion 71 of the fabric body 72, so that the header assembly 80 can slide along the slide rails 60 to removably engage with the top edge of the windshield 18 while drawing the forward portion 71 of the fabric body 72 forwardly to cover the front passenger compartment 14 (FIG. 2). When it is desirable to expose the front passenger compartment 14 to ambience, in one aspect the header assembly 80 of the soft top 70 may be disengaged from top edge 19 of the windshield 18 to slide rearward along the slide rails 60 while the forward portion 71 of the fabric body 72 is folded backward so that it also rests on the center portion of the roll cage (FIG. 1).

Thus, as can be seen in FIGS. 1 and 2, the header assembly and forward portion 71 of the fabric body 72 can be independently deployed or withdrawn to cover or uncover, respectively, the front passenger compartment 14. Likewise, the back portion 73 of the fabric body 72 can be independently deployed or withdrawn to cover or uncover, respectively, the rear passenger compartment 20. The processes for deployed or withdrawing either portion of the soft top is generally accomplished manually, and may require just a few moments when the soft top 70 is secured to the center portion of the roll cage when withdrawn from its deployed configuration, as illustrated in FIG. 1. Alternatively, the soft top 70 can be entirely removed from the vehicle body 12 to completely expose the passenger compartment to ambience, while still leaving the outer frame 41 in place and providing a roof rack 40 for storage of gear and other items.

Figure 3:
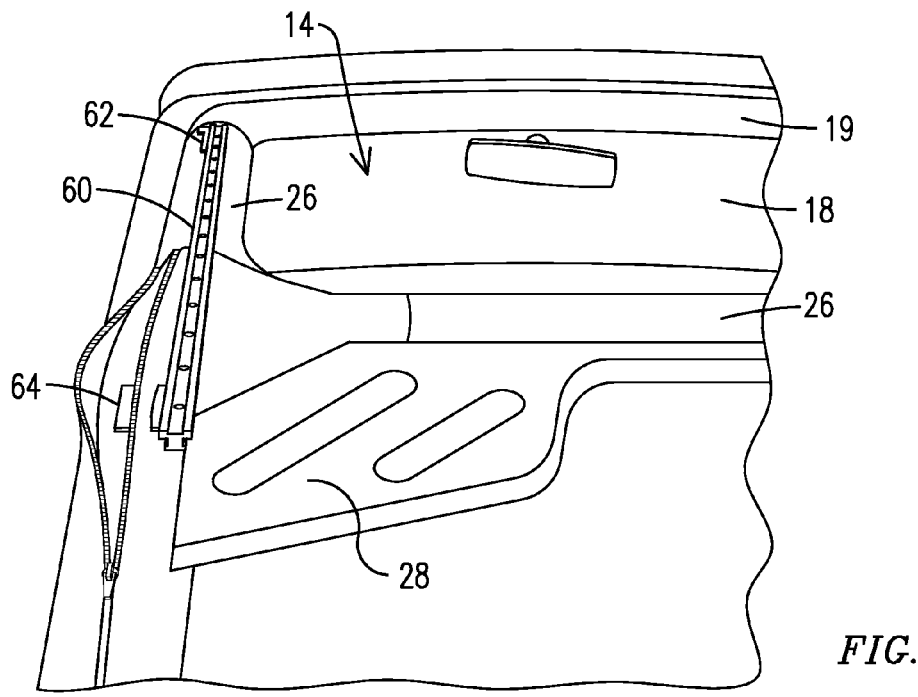
FIG. 3 shows the mounting of the slide rails of the roof rack and soft top assembly of FIG. 1 to the off-road vehicle.

FIGS. 3-16 generally illustrate a method for installing the roof rack and soft top assembly 30 to an off-road vehicle having an exposed passenger compartment that is protected by a windshield and a roll cage. As shown in FIG. 3, for example, the method can include mounting the pair of slide rails 60 to the top of the roll cage 26 above the front passenger compartment 14. In one aspect, the slide rails 60 can be mounted to the roll cage 26 with a front mounting bracket 62 and a rear mounting brackets 64 using existing mounting holes that are pre-formed into the roll cage 26. In aspects where the roll cage 26 is at least partially covered by protective padding, as illustrated, the front and rear mounting brackets can be secured to the roll cage with fasteners that extend through the padding to become engaged within the mounting holes. In general, the mounting brackets 62, 64 can be configured so that slide rails are aligned true and parallel with each other and with the long axis of the vehicle 10, so as to avoid any binding of the header assembly as it slides back and forth along the slide rails 60 between the deployed position and the withdrawn position.

Figure 4:
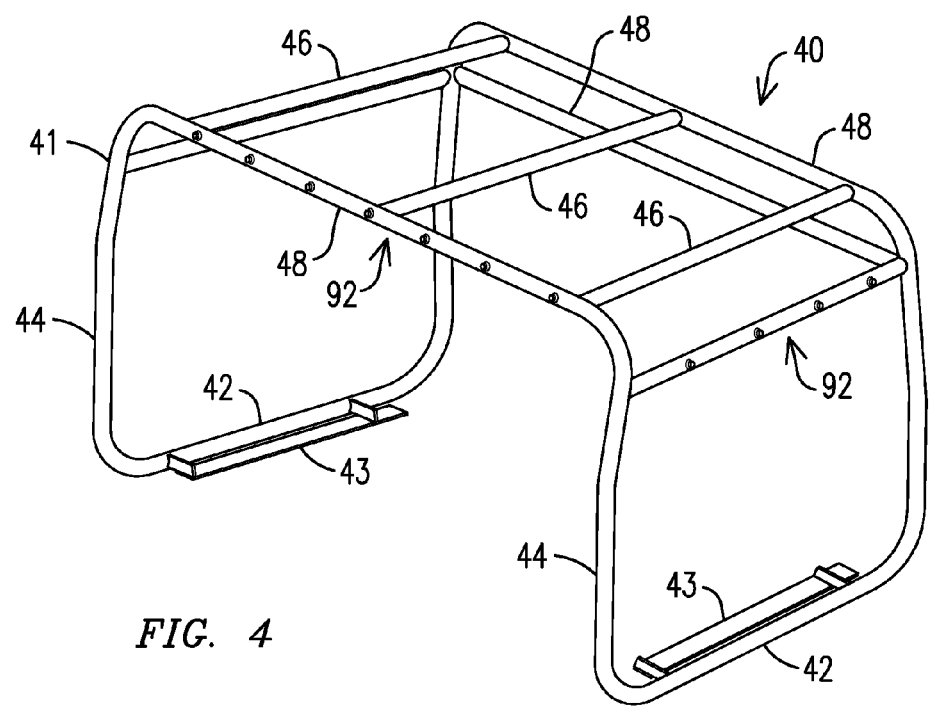
FIG. 4 shows the outer frame of the roof rack and soft top assembly of FIG. 1, prior to mounting to the off-road vehicle.
Figure 5:
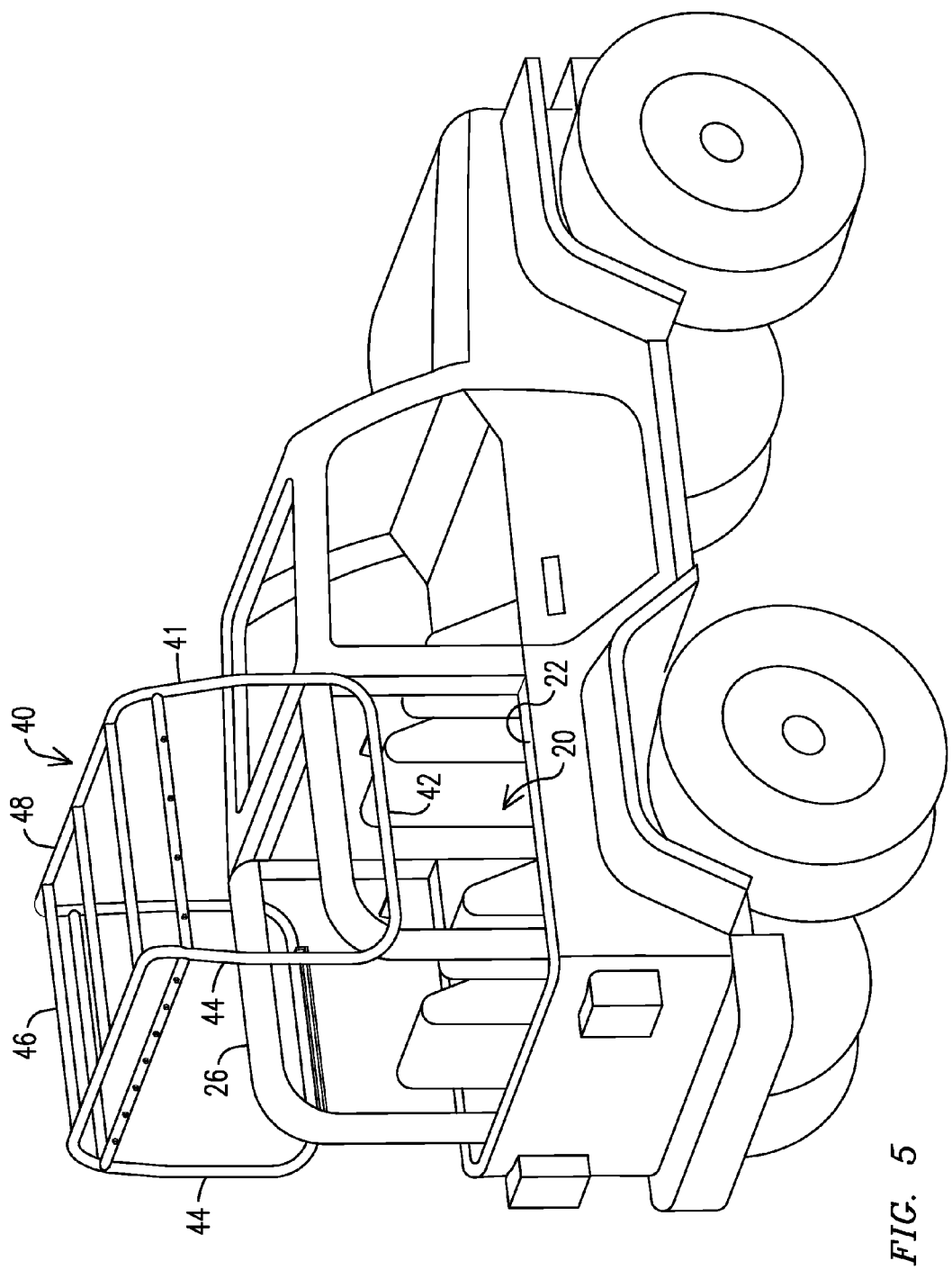
FIG. 5 shows the mounting of the outer frame to the off-road vehicle.
Figure 6:
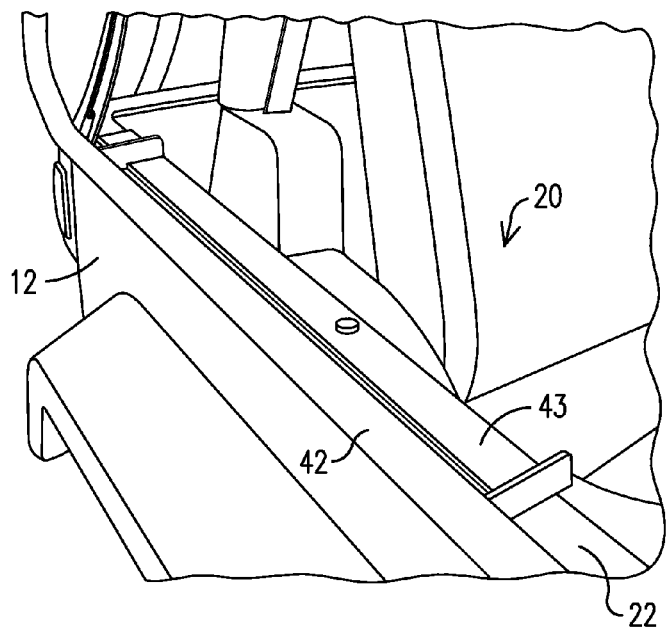
FIG. 6 is a close-up of the mounting bracket used to mount the outer frame to the tub portion to the off-road vehicle.

In the embodiment shown in FIGS. 4-6, the outer frame 41 can comprise a cage of interconnected bars, including base bars 42 that may be secured with brackets 43 to the tub rails 22 on either side of the rear passenger compartment 20 (FIG. 6), along with vertical support bars 44 that extend upwardly from the ends of the base bars 42 to couple with transversely-extending crossover bars 48 that extend across the width of the vehicle and couple with the vertical support bars 44 on the other side. A plurality of longitudinally-extending top bars 46 can extend between the vertical support bars 44 and the crossover bars 48 across the top of the outer frame 41 to define the top platform 47 of the roof rack 40. In one aspect, the base bars 42 can be positioned outwardly from the tub rails 22 by the brackets 43 so as to provide additional interior room inside the rear passenger compartment 20 (FIG. 6).

Figure 7:
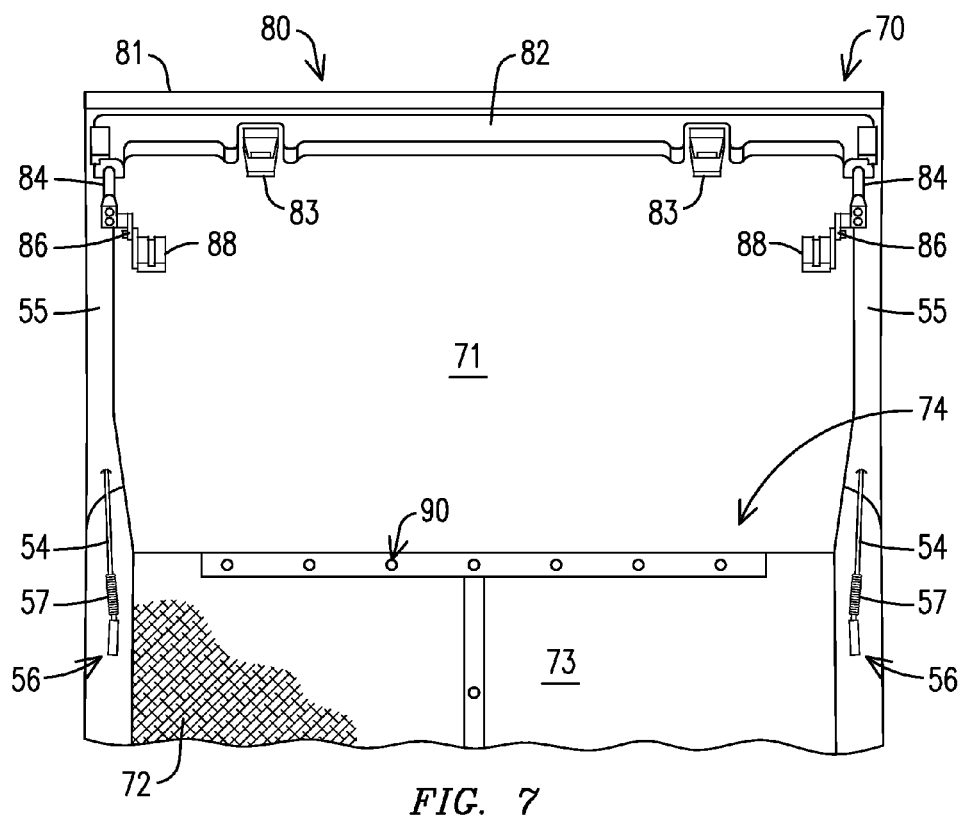
FIG. 7 shows the soft top of the roof rack and soft top assembly of FIG. 1, prior to mounting to the off-road vehicle.

One embodiment of the soft top 70 that can engage with the roof rack 40 and the slide bars 60 is shown in FIG. 7, and illustrates the header assembly 80 that is attached to the forward portion 71 of the fabric body 72. The fabric body 72 can be made from one or more panels of a heavy-duty and weather-resistant material, such as canvas treated with a water-proofing compound, a synthetic polymer-based fabric, and the like. The header assembly 80 includes a header bar 82 having a front edge 81 and engagement clips 83 that are configured to engage with the top end of the windshield to form a weather-tight seal between the windshield and the soft top 70. The header assembly 80 can also include side bars 84 coupled to the side edges of the header bar 82 and that extending rearwardly away from the header bar 82 when the soft top 70 is in its deployed configuration. Movable or slidable blocks 88 can be mounted to the distal ends of the side bars 84 with swivel brackets 86 that allow the side bars 84, and hence the header bar 82, to rotate relative to the slide blocks 88. The slide blocks 88 can generally be positioned interior to the side edges of the fabric body 72 so that when the soft top 70 is moved to its deployed configuration, the fabric body 72 covers the slide rails 60.

Also shown in FIG. 7, the fabric body 72 generally includes a top panel 74 with one or more rows of clips or first fastener parts 90 that are secured to or extend through the fabric body 72. In one aspect, the fabric body may be strategically strengthened with reinforcement seams that extend along the rows of first fastener parts 90 to provide extra strength and material that can reduce the wear and tear on the fabric in the high-stress attachment areas. The clips or first fastener parts 90 are configured to couple to complimentary second fastener parts 92 that can be positioned on the surfaces of the top bars and the crossover bars of the outer frame 41.

Figure 8:
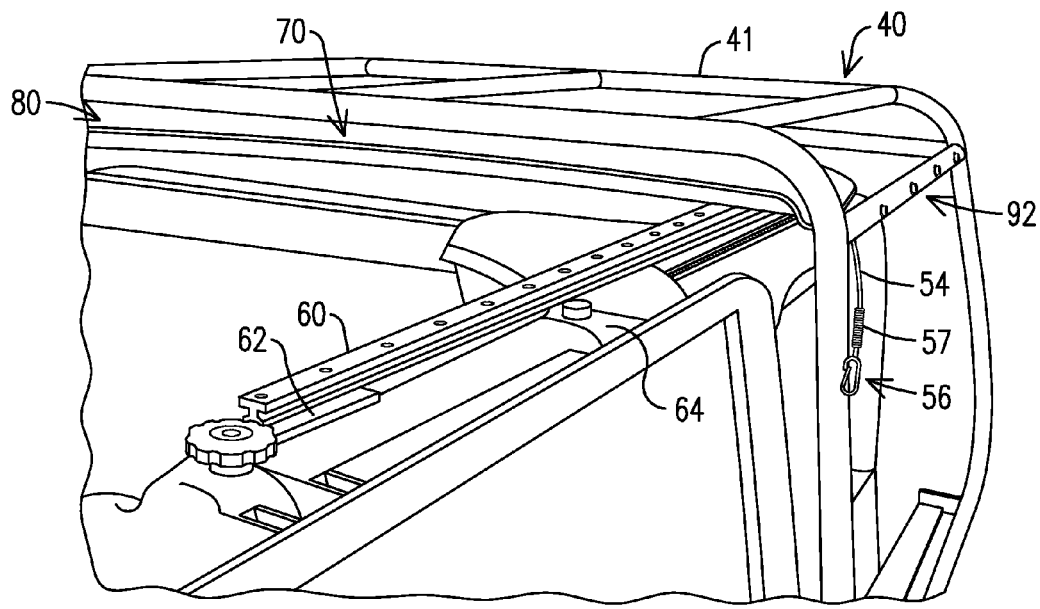
FIG. 8 shows the soft top being installed between the outer frame and the roll cage of the off-road vehicle.
Figure 10:
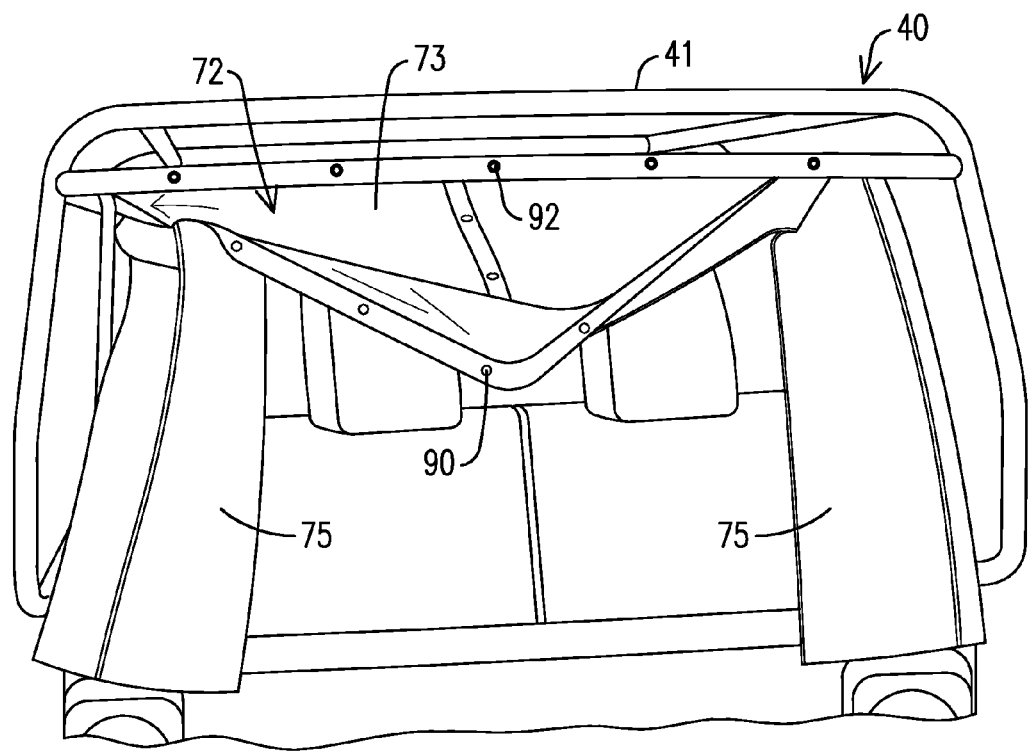
FIG. 10 shows the fabric body of the soft top being positioned over the rear passenger compartment of the off-road vehicle.
Figure 11:
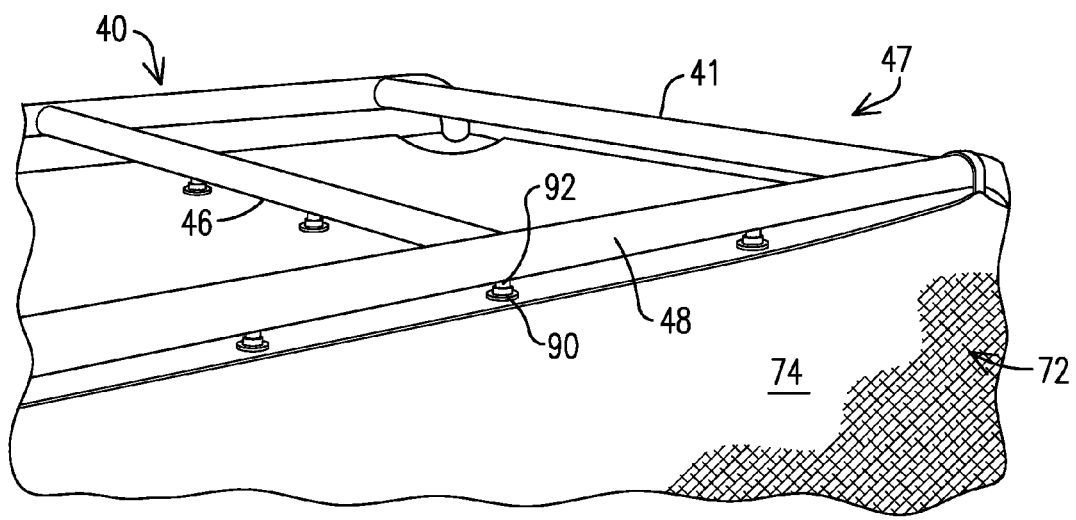
FIG. 11 shows the fabric body being suspended from the outer frame over the rear passenger compartment.

For example, in one aspect the fabric body can be secured to the outer frame with TENAX-type self-locking snap fasteners, with a plurality of button caps or first fastener parts 90 extending through the fabric body 72 (FIGS. 7, 12) to connect with a complimentary number of projecting studs or second fastener parts 92 that are mounted to the outer frame (FIGS. 8, 10, 11). However, as shown in more detail below, other means of securely attaching the fabric body 72 to the outer frame 41 and the vehicle body 12 are also contemplated and considered to fall within the scope of the present disclosure.

Figure 9:
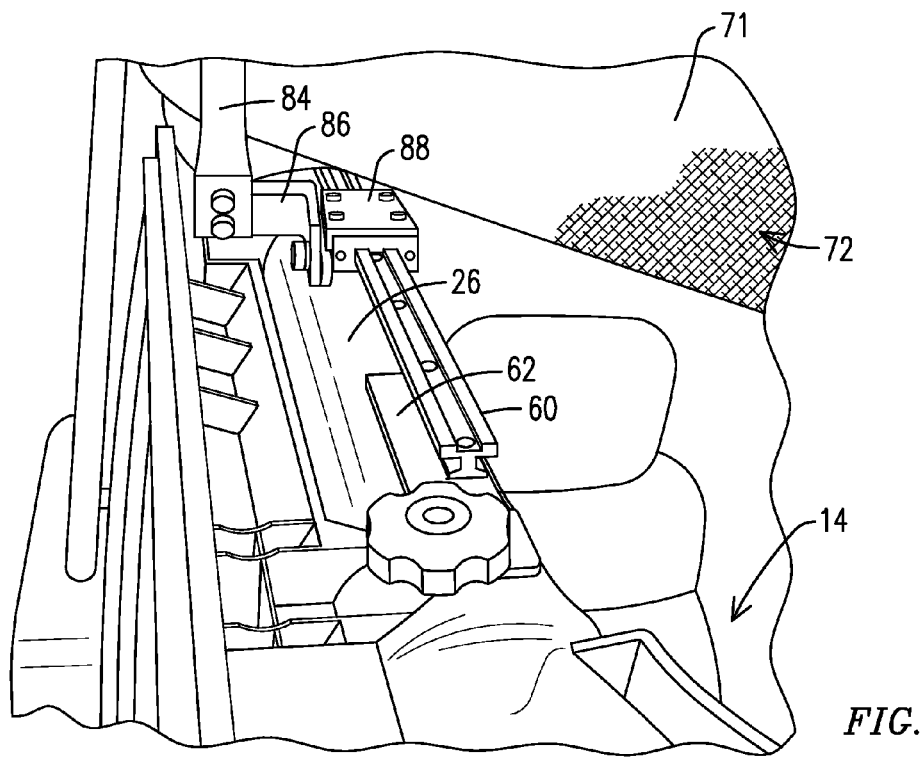
FIG. 9 shows the header assembly of the soft top being installed onto one of the slide rails mounted to the top of the roll cage.

As shown in FIGS. 8-9, the soft top 70 can be installed to the slide rails 60 and outer frame 41 by first positioning the header assembly 80 and forward portion 71 of the fabric body 72 adjacent the rear mounting brackets 64 and rear edges of the slide rails 60 (FIG. 8), and then moving the slide blocks 88 of the header assembly 80 into slidable engagement with the slide rails 60 (FIG. 9). Once both slide blocks 88 are slidably engaged with the slide rails 60, the header assembly 80 and forward portion 71 of the fabric body 72 may be moved to any position over the front passenger compartment 14 as desired.

In one embodiment, the slide rails 60 can comprises a "T"-shaped cross-section with the slide block have a complimentary "T"-shaped aperture. As such, the horizontal bar across the top of the "T" can restrict the vertical movement of the slide blocks 88, while the center post of the "T" can restrict lateral or side-to-side movement of the slide blocks 88, thereby allowing the slide blocks to only travel forward and backward along the linear length of the slide rails 60. In addition, the slide blocks 88 and/or the slide rails 60 can be formed or coated with the low-friction material that allows the slide blocks 88 to move easily while in sliding contact with the slide rails 60. However, it will be appreciated by one of skill in the art that other configurations and materials for movable blocks 88 that are translatably engageable with the rails 60 are also possible, and may be considered to fall within the scope of the present disclosure, including but not limited to movable blocks with rolling element bearings, slide rails with linear bearings, and the like.

After the header assembly of the soft top has been attached to the slide rails, the back portion 73 of the fabric body 72 can be unfolded or extended into the space between the roll cage and the outer frame 41, as shown in FIG. 10. If the fabric body includes removable side panels and back panels (not shown), corner flaps 75 can extend downward from the top panel 74 toward the back corners of the tub rail 22. With reference to FIGS. 11 and 12, the first fastener parts 90 on the top panel 74 can then be engaged with the second fastener parts 92 on the outer frame 41 to secure fabric body 72 tautly to the outer frame 41, so that the surfaces of the fabric body 72 may generally conform to the shape defined by the outer frame 41. In addition, the second fastener parts 92 can be mounted to the interior surfaces of the outer frame 41 so that the top panel 74 of the fabric body 72 is suspended from the outer frame 41, rather than draped over the tops of the interconnected top bars 46 and crossover bars 48 that form the outer frame 41. In this way, the fabric body 72 can be attached to and withdrawn from the outer frame 41 without disturbing any cargo items or gear that may be stored on the top platform of the roof rack 40. With the top panel 74 is installed to the outer frame 41, the corner flaps 75 can then be attached to the tub rail 22 (FIG. 17) with the same fastener system used between the top panel 74 and the outer frame 41, or with a different fastening system if so desired.

Other means of securely attaching the fabric body 72 to the outer frame 41 and the vehicle body 12 are also possible. Instead of fasteners, for example, a plurality of lopped attachment features can be located generally along the edges and reinforced seams of the top panel 74 and edge flaps 75 for releasably attaching the fabric body 72 to the outer frame 41. Two possible looped attachment features 94, 96 are illustrated in FIGS. 13A and 13B, respectively, with each comprising an elongated open loop 95 of material having one side secured to the fabric body 72 and another side that is normally open longitudinally, and that can be wrapped around a corresponding bar of the outer frame 41 and then releasably closed to grip the bar. In the embodiment of FIG. 13A, the open loop 95 of the attachment feature 94 is closed around a bar (for example, vertical support bar 44) of the outer frame and attached with hook-and-loop fasteners 98. With the attachment feature 96 of FIG. 13B, a zipper 99 is disposed along the edges of the open side of each loop 95. It will thus be seen that the loops can be moved into place, each surrounding a corresponding bar of the roof rack, and once surrounding the bar, closed around the bar using the zipper. Other configurations of attachment features such as, for instance, ties, laces, loops, and the like, are all possible and within the scope of the present disclosure.

Figure 14:
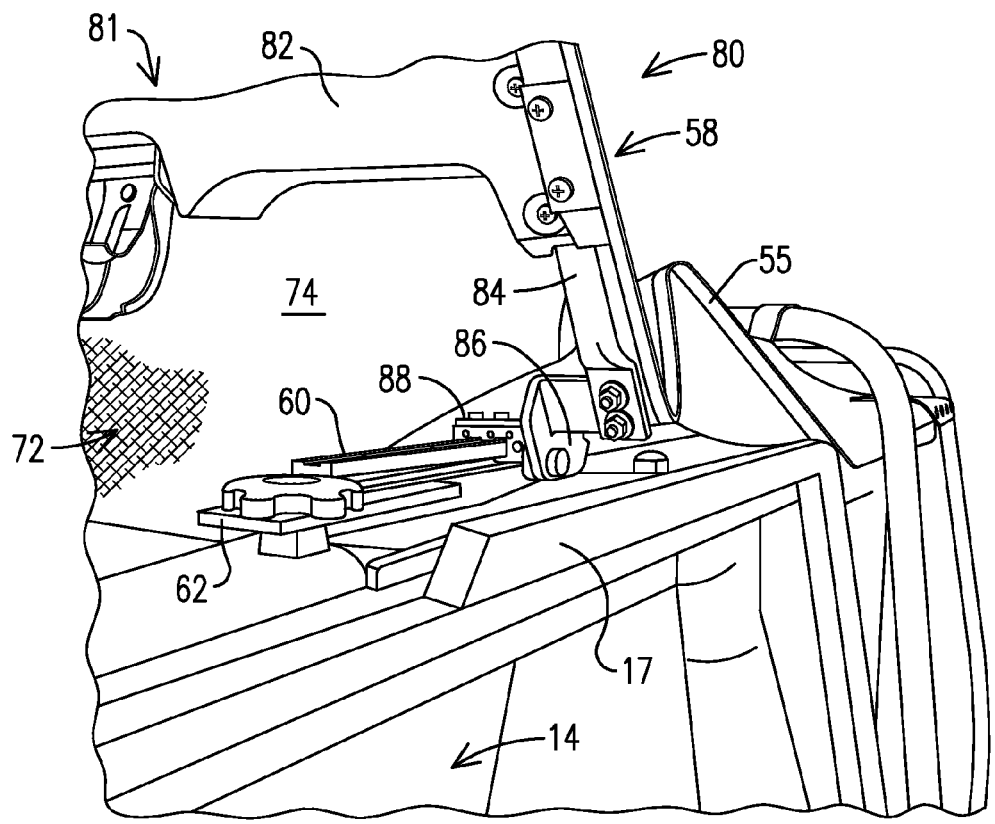
FIG. 14 shows the header assembly of the soft top being moved along the slide rails over the front passenger compartment.
Figure 15:
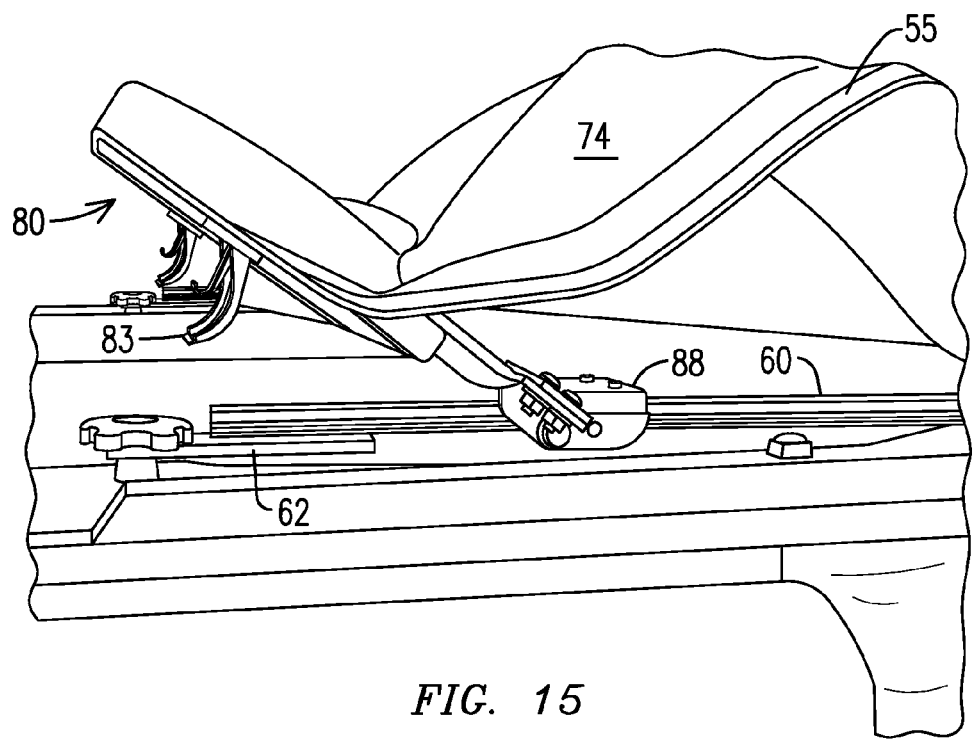
FIG. 15 shows the header assembly of the soft top being moved further along the slide rails over the front passenger compartment.
Figure 16:
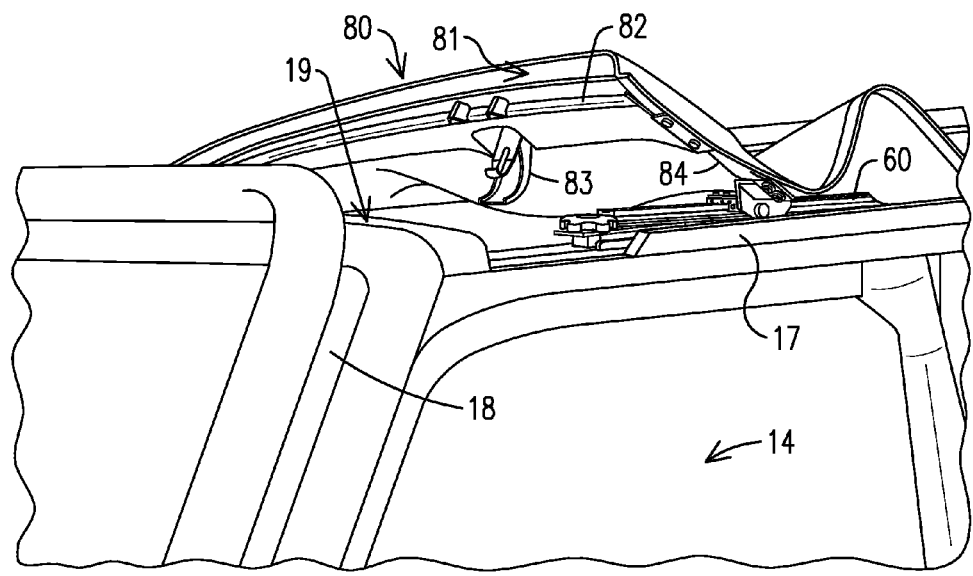
FIG. 16 shows the header assembly of the soft top being moved toward engagement with the top edge of the windshield.

Once the slide blocks 88 of the header assembly 80 of the soft top 70 have been slidably engaged with the slide rails 60 that are mounted to the top of the roll cage 26, the header assembly 80 is operable to slide along the slide rails 60 and removably engage the front edge 81 of the header bar 82 with the top edge 19 of the windshield 18, as shown in FIGS. 14-16. During this motion, the forward portion 71 of the fabric body 72 that is attached to the header assembly 80 is also drawn over the front passenger compartment 14. Furthermore, in embodiments in which the slide blocks 88 of the header assembly are rotatably coupled and spaced from the header bar 82 with swivel brackets 86 and side bars 84, respectively, the header bar may naturally travel through an arc above the slide rails 60 as it is moved forward to engage with the windshield. When the slide blocks 88 reach the front mounting brackets 62 at the forward ends of the slide rails 60, the final motion of the header bar will be to rotate downward around the swivel brackets to allow the engagement clips 83 to couple with corresponding attachment brackets (not shown) extending from the top edge 19 of the windshield 18. In one aspect, the top panel 74 of the fabric body 72 can be sized and configured so that the step of engaging the clips 83 with the attachment brackets on the windshield can allow a user to rotate the header bar 82 downward around the swivel brackets 86, and thereby draw the top panel 74 taut over the top of the front passenger compartment 14.

In another aspect, tension cables 54 can also be installed into looped channels 55 sewn into the side edges of the top panel 74 (FIGS. 7, 14). The back ends 56 of the tension cables 54 can be connected to either the roll cage or to the outer frame 41 of the roof rack 40 proximate the rear passenger compartment with a spring 57 (FIGS. 7, 8), while the front ends 58 of the tension cables 54 can be secured to sides of the header bar 82 (FIG. 14). In this configuration, rotating the header bar 82 downward around the around the swivel brackets 86 can also pull the spring-loaded tension cables taut within their respective looped channels 55, and thereby draw the side edges of the top panel 74 snug against the door surrounds 17 on either side of the front passenger compartment 14. Thus, engaging the header bar 82 with the top edge 19 of the windshield 18 can serve to form a weather-tight seal both between the windshield 18 and the soft top 70 and between the soft top 70 and the door surrounds 17.

Figure 17:
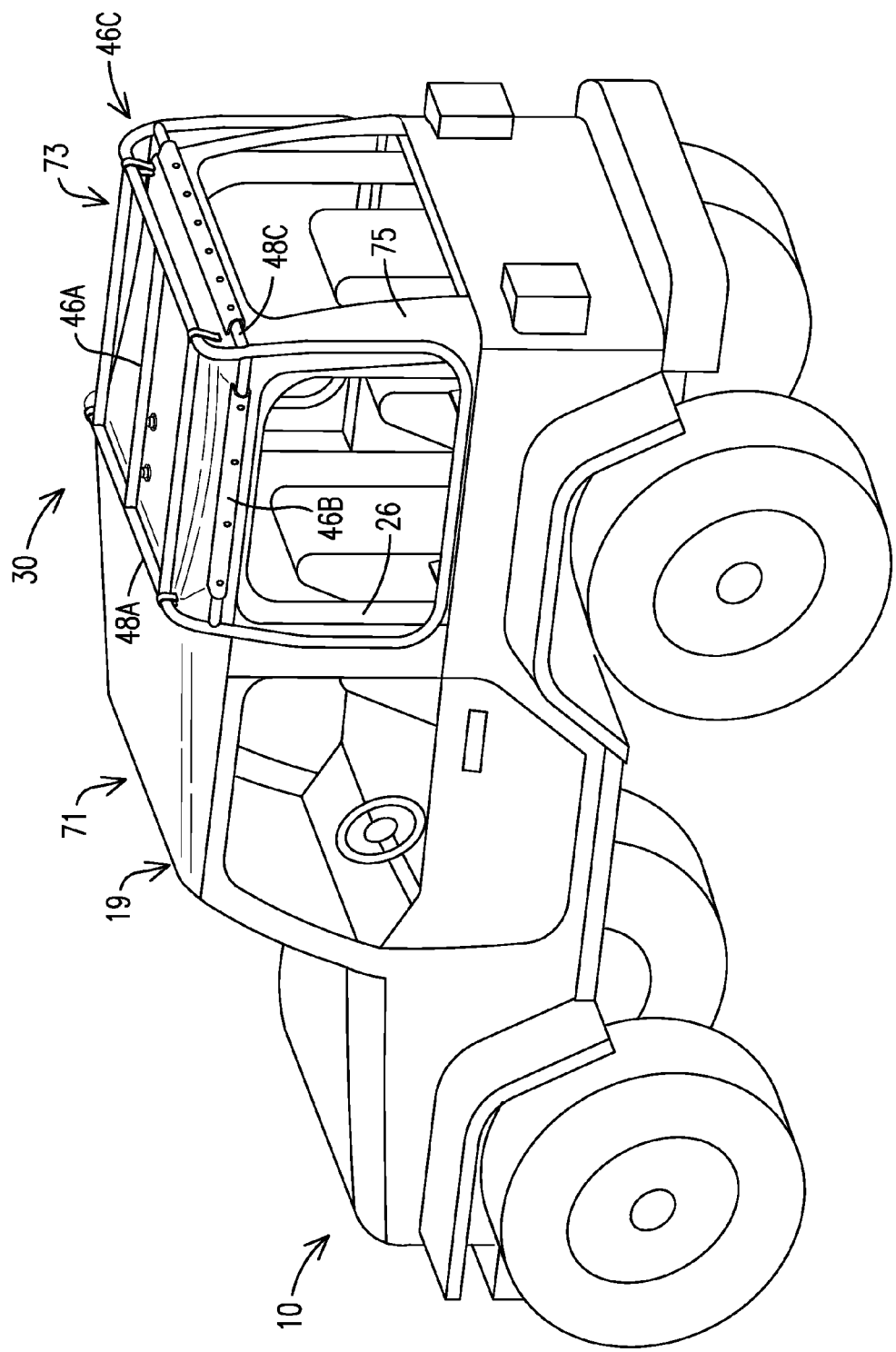
FIG. 17 is a rear perspective view of the roof rack and soft top assembly of FIG. 1 with the soft top in a deployed configuration and without the removable side and rear panels.

The rear perspective view of the installed and deployed roof rack and soft top assembly 30, without side panels and a back panel, is provided in FIG. 17. As can be seen, the forward portion 71 of the fabric body is drawn taut between the top edge 19 of the windshield 18 and the forward crossover bar 48A that extends across a center portion of the off-road vehicle 10, with the top panel 74 of the fabric body being coupled to and suspended from the forward crossover bar 48A by a row of fasteners 90, 92 that extend across the width of the top panel 74. The connection between the top panel 74 and the forward crossover bar 48A can also be seen in FIGS. 11 and 19.

Figure 19:
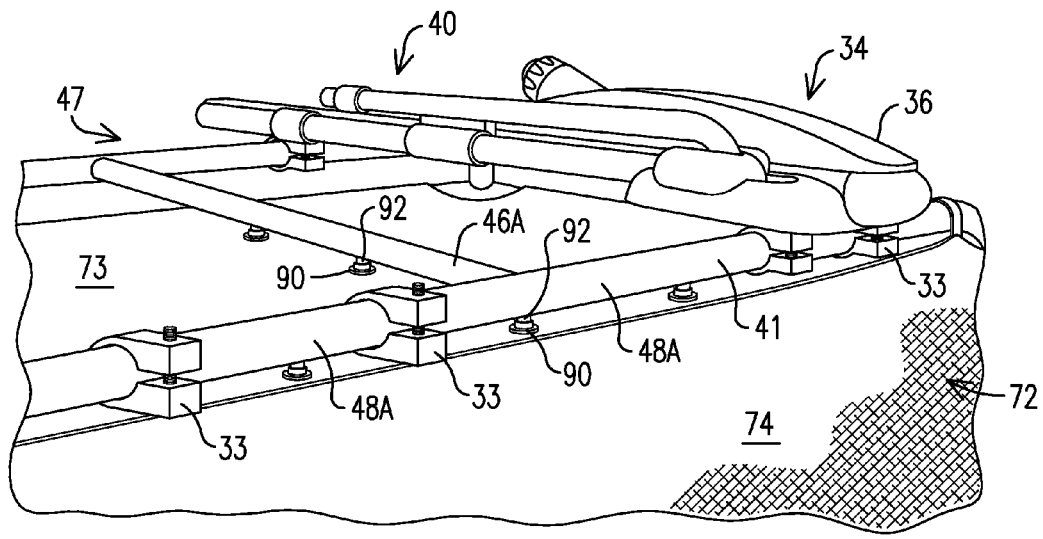
FIG. 19 shows a rack device being mounted to the outer frame of the roof rack and soft top assembly.

The back portion 73 of the fabric body is also drawn taut between the forward crossover bar 48A and the lower, rear crossover bar 48C to which it is also connect with a row of fasteners 90, 92. FIGS. 11 and 19 also show a shortened row of fasteners 90, 92 between the back portion 73 of the fabric body and the center top bar 46A, which connection may not continue along the complete length of the center top bar 46A. On the sides, the back portion 73 of the fabric body 72 is connected to the lower top bars 46B, 46C. As the forward crossover bar 48A and center top bar 46A are slightly elevated above the lower, rear crossover bar 48C and the lower top bars 46B, 46C, the deployed back portion 73 of the fabric body can include a slope that sheds water and moisture over the soft top 70 and away from the vehicle 10. Maintaining the firm and taut configuration, the corner flaps 75 can extend downwardly from the top panel 74 to be connected to the back corners of the tub rail 22. When all of the first fastener parts 90 or attachment features on the soft top 70 are thus secured to their corresponding adjacent bars, the soft top 70 is stretched tightly within the confines of the outer frame 41, and the interior of the normally open vehicle is covered and its passengers and cargo are at least partially protected from the elements by the fabric body 72.

Figure 18:
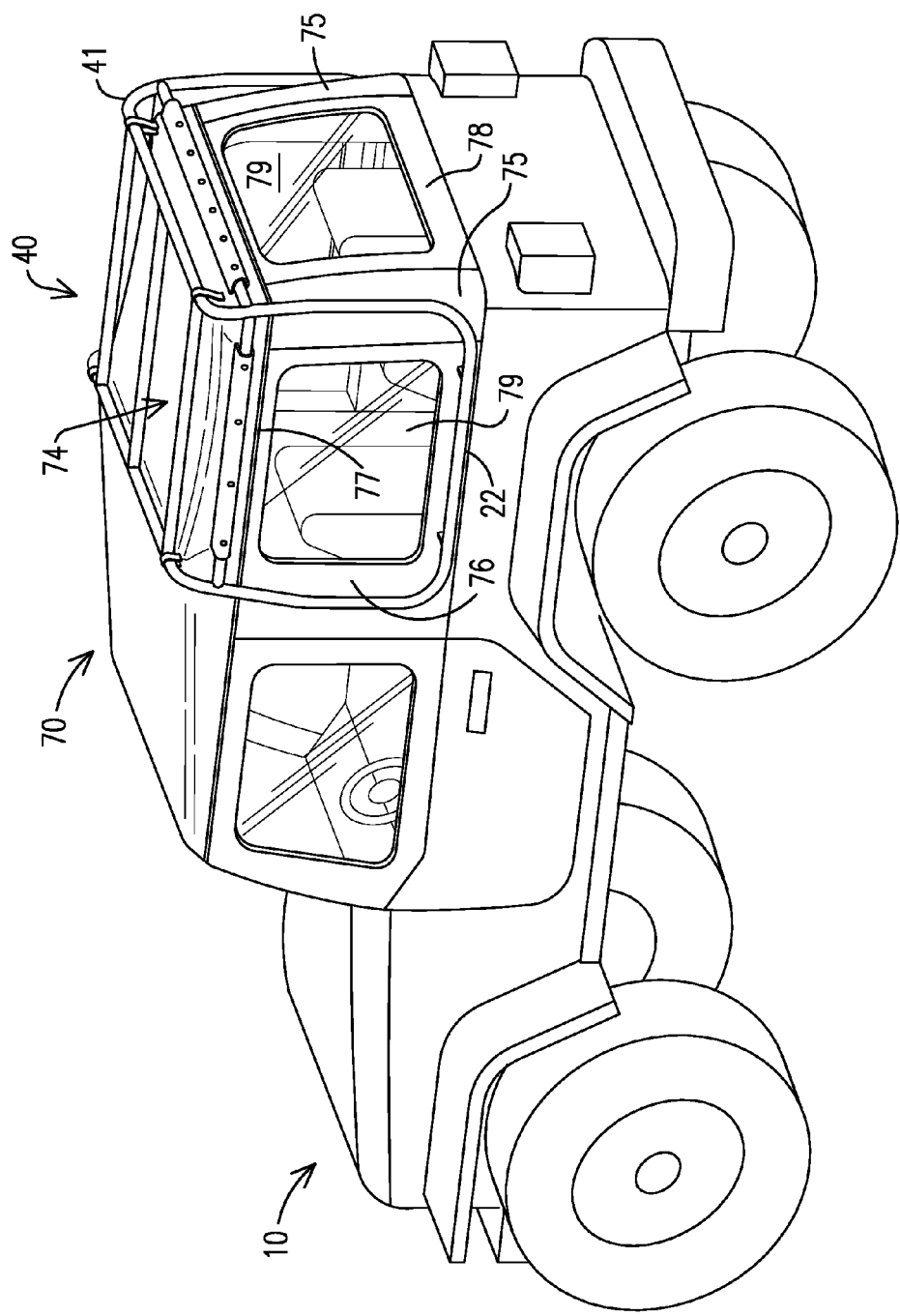
FIG. 18 is another rear perspective view of the roof rack and soft top assembly of FIG. 1 with the soft top in a deployed configuration and including the removable side and rear panels.

In addition to the top panel 74 and the corner flaps 75 that can form the fabric body 72, the soft top 70 can further include removable side panels 76 and a removable back panel 78 that may be provided with clear plastic window portions 79, as shown in FIG. 18, to admit light and provide a pleasing appearance and visibility while fully protecting the occupants and cargo from the elements. The removable panels 76, 78 may each be sized and configured to fit within the framed openings defined by the interconnect bars of the outer frame 41, and may be attached to the top panel 74 and corner flaps with zippers 77. In this way, the entire soft top 70, when deployed, conforms generally to the shape of the outer frame 41 that also defines the roof rack 40.

As further shown in FIG. 19, a variety of gear mount or rack devices 34 can be attached to the top bars 46 and crossover bars 48 that form the top platform 47 of the roof rack 40. The rack devices 34, such as the depicted kayak support 36, can be adjustably secured to the crossover bars 48 or top bars 46 with C-clamps 33 that surround and grip the bars when tightened. It is to be appreciated that a wide variety of rack devices can thus be coupled to the top platform, including but not limited to bicycle racks, canoe racks, ski racks, snowboard racks, surfboard racks, along with a variety of general purpose cargo racks that can hold and secure loose items or cargo such as camping gear, tents, coolers, luggage and the like.

Figure 20:
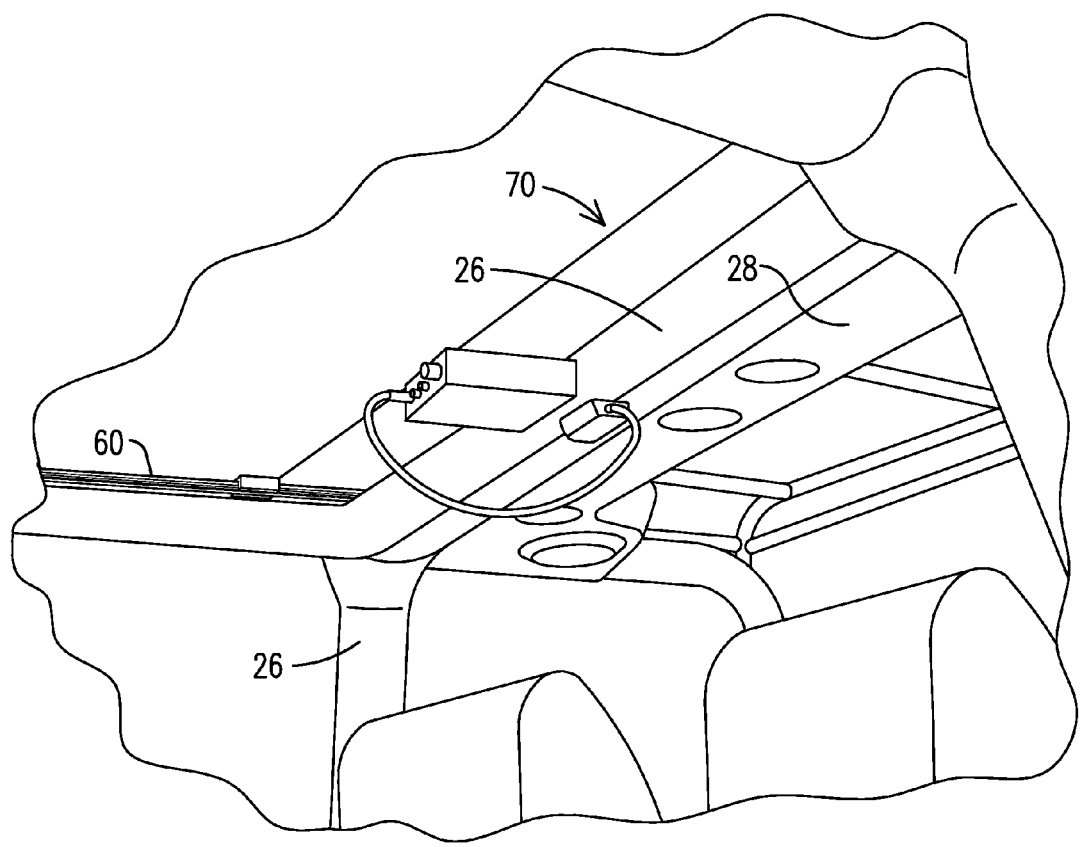
FIG. 20 shows the soft top of the roof rack and soft top assembly of FIG. 1 being folded and secured above a sound bar attached to the roll cage of the off-road vehicle.

In some cases, the roll cage 26 of the off-road vehicle may include an electronics console or sound bar 28 that can store and protect a variety of electronic and audio gear, such as speakers, a stereo system, a CB radio, a DVD player and the like. Thus, in another aspect of the disclosure shown in FIG. 20, the soft top 70 (with the side and back panels removed) can be withdrawn or retracted from covering both the front passenger compartment and the rear passenger compartment and wholly stored above the sound bar 28 so that the soft top 70 is substantially obscured from view of the occupants by the sound bar 28. This feature has the advantage of providing maximum exposure to ambience for the occupants of the off-road vehicle when the soft top 70 is in the withdrawn configuration, while still providing for quick deployment of the soft top in response to changing weather conditions without off-loading the gear or cargo that may be stored on the roof rack.

FIG. 21 illustrates another embodiment of the combination roof rack and removable soft top 130 that has been sized and configured for use with a 4-door off-road vehicle 110, such as a 4-door Jeep® Wrangler® brand vehicle. The roof rack and soft top assembly 130 is mounted above the exposed passenger compartment of the vehicle 110 that is protected by the windshield 118 and a roll cage (not shown), and generally includes a roof rack 140 comprising an outer frame 141 that is mounted to the vehicle body 112 and surrounds the rear passenger compartment 120. In one aspect, the outer frame 141 can comprises a cage of interconnected bars.

The roof rack and soft top assembly 130 also includes a soft top 170 comprising a fabric body 172 having a forward portion 171 and a back portion 173, with the back portion 173 being removably coupled to the outer frame 141 so that the back portion 173 of the soft top 170 is suspended from the roof rack 140 between the outer frame 141 and the roll cage and covers the rear passenger compartment 120, which can include both the second row of seats 122 and the tub area 123 between the second row of seats 122 and the tail gate 124.

The roof rack and soft top assembly further includes a header assembly 180 attached to a forward portion 171 of the fabric body 172 with a front edge that is operable to removably engage with the top edge of the windshield 118 while drawing the forward portion 171 of the fabric body 172 over the front or driver's portion 114 of the passenger compartment. Although not visible in the drawings, in one aspect the assembly can also include a pair of rails mounted to the top of the roll cage above the front passenger compartment, along with a pair of movable blocks that form a portion of the header assembly and that are translatably engageable with the rails. In this embodiment the header assembly can be operable to translate along the rails while drawing the forward portion 171 of the fabric body 172 over the front portion 114 of the passenger compartment.

The invention has been described herein in terms of preferred embodiments and methodologies considered by the inventor to represent the best mode of carrying out the invention. It will be understood by the skilled artisan; however, that a wide range of additions, deletions, and modifications, both subtle and gross, may be made to the illustrated and exemplary embodiments without departing from the spirit and scope of the invention. These and other revisions might be made by those of skill in the art without departing from the spirit and scope of the invention that may be further defined by the following aspects.

What is claimed is:

1. A roof rack and soft top assembly for a vehicle body having an exposed passenger compartment protected by a windshield and a roll cage, the assembly comprising:
    an outer frame mounted to the vehicle body exterior to the roll cage and surrounding a rear portion of the passenger compartment; and
    a soft top between the outer frame and the roll cage, the soft top including:
        a fabric body having a plurality of fasteners spaced across a back portion thereof and operable to removably attach the back portion of the fabric body to the outer frame and cover the rear portion of the passenger compartment; and
        a header assembly attached to a forward portion of the fabric body and having a front edge that is operable to removably engage with the top edge of the windshield while drawing the forward portion of the fabric body over a front portion of the passenger compartment.

2. The roof rack and soft top assembly of claim 1, wherein the header assembly further includes a header bar forming the front edge and having at least one latch for securing the header bar to the upper edge of the windshield.

3. The roof rack and soft top assembly of claim 2, wherein the header assembly is rotatably engageable with the top edge of the windshield.

4. The roof rack and soft top assembly of claim 1, further comprising:
    a plurality of rails mounted to the top of the roll cage above the front passenger compartment; and
    a plurality of movable blocks forming a portion of the header assembly and that are translatably engageable with the rails,
    wherein the header assembly is operable to translate along the rails while drawing the forward portion of the fabric body over the front portion of the passenger compartment.

5. The roof rack and soft top assembly of claim 4, wherein the header assembly further includes side bars extending from the header bar and pivotably coupled to the movable blocks to allow the header bar to rotate into and away from engagement with the top edge of the windshield.

6. The roof rack and soft top assembly of claim 4, wherein the rails are slide rails and the movable blocks are slidably engageable with the slide rails.

7. The roof rack and soft top assembly of claim 1, wherein the plurality of fasteners are operable to removably suspend the back portion of the fabric body from the outer frame.

8. A roof rack and soft top assembly for a vehicle body having an exposed passenger compartment protected by a windshield and a roll cage, the assembly comprising:
   an outer frame mounted to the vehicle body exterior to the roll cage and surrounding a rear passenger compartment;
   a pair of slide rails mounted to the top of the roll cage above a front passenger compartment; and
   a soft top between the outer frame and the roll cage, the soft top including:
      a fabric body having a plurality of fasteners spaced across a back portion thereof and operable to removably suspend the back portion of the fabric body from the outer frame and cover the rear passenger compartment; and
      a header assembly attached to a forward portion of the fabric body, the header assembly including a pair of slide blocks that are slidably engageable with the slide rails and a front edge that is engageable with a top edge of the windshield, the header assembly being operable to slide along the slide rails to removably engage with the top edge of the windshield while drawing the forward portion of the fabric body over the front passenger compartment.

9. The roof rack and soft top assembly of claim 8, wherein the plurality of fasteners further comprise snap fasteners.

10. The roof rack and soft top assembly of claim 8, wherein the plurality of fasteners further comprise loops of fabric secured to the fabric body and closeable around selected bars of the outer frame.

11. The roof rack and soft top assembly of claim 10, wherein the loops of fabric are secured with hook and loop fasteners or zippers.

12. The roof rack and soft top assembly of claim 8, wherein the fabric body further comprises a top front panel, a top rear panel, and rear corner flaps.

13. The roof rack and soft top assembly of claim 12, wherein the top front panel, the top rear panel and the rear corner flaps are foldably storable above a sound bar extending between the rearward portion and the front passenger compartment.

14. The roof rack and soft top assembly of claim 12, wherein the soft top further includes a back panel and at least two side panels that are removably secured to the fabric body with zippers.

15. The roof rack and soft top assembly of claim 8, wherein the header assembly further includes a header bar forming the front edge and having at least one latch for securing the header bar to the upper edge of the windshield.

16. The roof rack and soft top assembly of claim 15, wherein the header assembly further includes side bars extending from the header bar and pivotably coupled to the pair of slide blocks to allow the header bar to rotate into and away from engagement with the top edge of the windshield.

17. The roof rack and soft top assembly of claim 15, further comprising a spring-loaded tension cable extending between the roll cage and the header bar along outer edges of the forward portion of the fabric body, and configured to support the outer edges of the forward portion of the fabric body against a door surround when the header bar is rotated into engagement with the top edge of the windshield.

18. The roof rack and soft top assembly of claim 8, wherein the outer frame is adapted to support at least one rack feature above the soft top.

19. The roof rack and soft top assembly of claim 18, wherein the at least one rack feature is selected from the group consisting of a bicycle rack, a canoe rack, a ski rack, a snowboard rack, a surfboard rack, and cage rack.

20. A method of covering an exposed passenger compartment of a vehicle body protected by a windshield and a roll cage, the method comprising:
   mounting an outer frame to the vehicle body exterior to the roll cage and surrounding a rear passenger compartment;
   mounting a plurality of rails to the top of the roll cage above a front passenger compartment;
   positioning a soft top between the outer frame and the roll cage, the soft top including a fabric body having a plurality of fasteners spaced across a back portion thereof and a header assembly attached to a forward portion thereof, the header assembly including a pair of movable blocks that are translatably engageable with the rails and a front edge that is engageable with a top edge of the windshield;
   engaging the pair of movable blocks with the rails;
   coupling the plurality of fasteners to the outer frame to attach the back portion of the fabric body from the outer frame and cover the rear passenger compartment;
   moving the header assembly forwardly along the rails to draw the forward portion of the fabric body toward the windshield and cover over the front passenger compartment; and
   engaging the front edge of the header bar with the top edge of the windshield to secure the soft top to the vehicle body.

* * * * *